United States Patent [19]

Ben-David et al.

[11] 4,355,294
[45] Oct. 19, 1982

[54] ALTITUDE ALERT SYSTEM

[75] Inventors: Menashe Ben-David, North Hollywood; Russell E. Poffenberger, Arleta, both of Calif.

[73] Assignee: Automation Industries, Inc., Greenwich, Conn.

[21] Appl. No.: 146,114

[22] Filed: May 2, 1980

[51] Int. Cl.³ ............................................. G08G 5/00
[52] U.S. Cl. ................................. 340/27 R; 364/433
[58] Field of Search ........... 340/27 R, 27 AT, 27 NA, 340/870.09; 360/12, 72; 73/178 R, 178 T; 364/433, 434, 439; 244/180

[56] References Cited

U.S. PATENT DOCUMENTS

| | | | |
|---|---|---|---|
| 3,538,264 | 11/1970 | Van Dyke | 340/27 R |
| 3,735,341 | 5/1973 | Hedrick | 340/27 R |
| 4,006,472 | 2/1977 | Greene | 340/27 R |
| 4,093,938 | 6/1978 | Argentieri et al. | 340/27 AT |
| 4,135,143 | 1/1979 | Argentieri et al. | 340/27 AT |

OTHER PUBLICATIONS

"Aircraft Signal Systems", AIEE Technical Paper, Rugge, Jan. 1944.
"The Promise of Air Safety", *IEEE Spectrum*, Jul. 1975, pp. 26-36.

*Primary Examiner*—James J. Groody
*Attorney, Agent, or Firm*—Francis N. Carten

[57] ABSTRACT

A system for providing a digital display of aircraft altitude, a selected altitude which it is desired the aircraft to assume and when the selected altitude is achieved, an audio and visual indication is produced. When within 1000 feet of the selected altitude, the visual indication gives the direction the aircraft must continue (i.e., up or down). When the aircraft exceeds a prescribed range, either above or below the selected altitude, an audio signal is produced. Barometric pressure obtained from air traffic control may be entered into the system and the measured altitude displayed will be automatically corrected.

3 Claims, 5 Drawing Figures

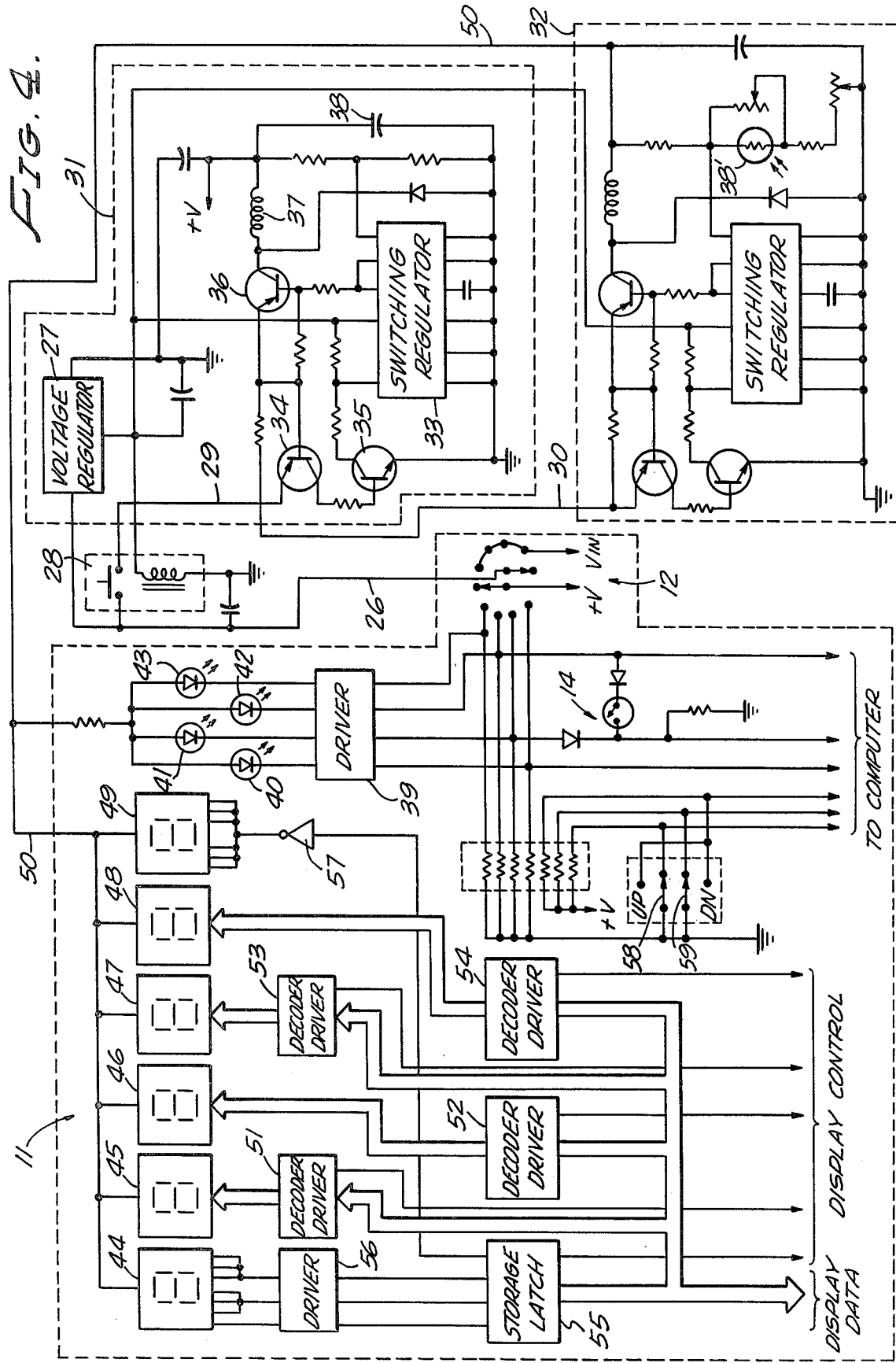

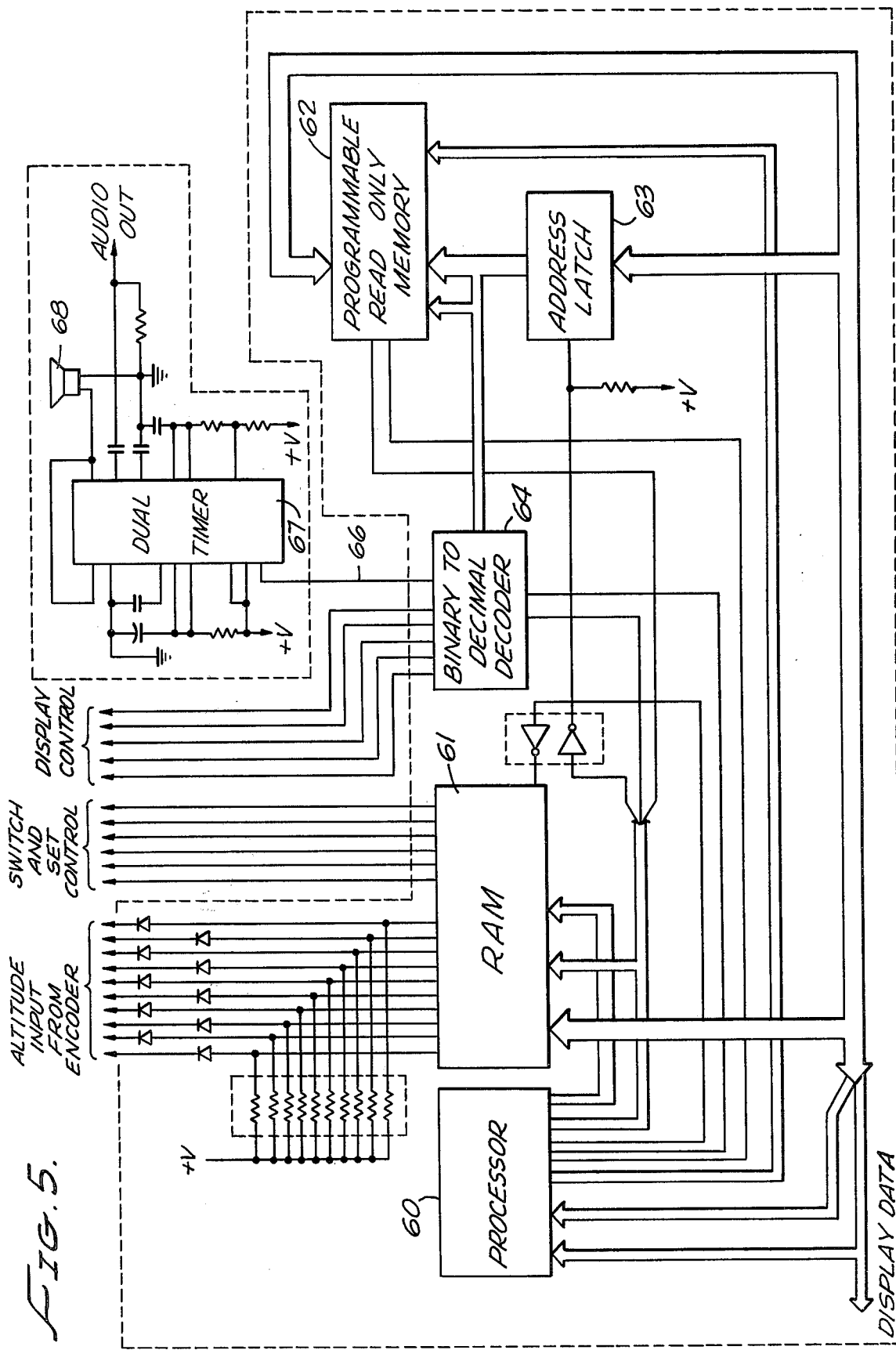

ALTITUDE ALERT SYSTEM

CROSS REFERENCE TO RELATED APPLICATION

In the disclosed altitude alert system, the processor inputs are preferably received from an altimeter encoder of the type disclosed and claimed in co-pending U.S. patent application Ser. No. 06/091,844 entitled REMOTE ALTITUDE ENCODER, filed on Nov. 6, 1979 in the name of the present applicant, and assigned to Automation Industries, Inc.; the disclosure of said co-pending application is hereby incorporated by reference into the present application.

The present invention relates generally to a system for monitoring the altitude of an aircraft, and, more particularly, to such a system which provides an alerting indication when a selected altitude is achieved by the aircraft and when the aircraft deviates a predetermined amount from the selected altitude.

BACKGROUND OF THE INVENTION

It is customary when making a flight plan, or when making an approach for a landing, that the flight or portions thereof be made at predetermined altitudes customarily under the supervision of air traffic control. For example, it may be determined according to certain flight plans that the aircraft should assume an altitude of, say, 5,000 feet and maintain this throughout the given course. Or in preparation for landing, because of other traffic, air traffic control may decide that the aircraft should approach from a given direction or along a given omni radial and maintain a certain altitude during interception of the new course. The pilot, of course, is at the same time involved in other activities concerning the flight of the aircraft including being on the alert for other traffic. Accordingly, the pilot may inadvertently allow the aircraft to wander from the given altitude and thereby pose a hazard to other aircraft in the vicinity or to his own aircraft due to local obstacles.

It has been conventional in the past, particularly in the handling of private planes, to rely solely upon the attentiveness of the pilot to monitor altitude and comply with air traffic control requirements in this regard.

SUMMARY OF THE INVENTION

In the practice of the present invention, there is provided a system which continuously monitors the aircraft altitude and provides a digital display of the present altitude. In a first aspect, a selected altitude which it is desired the aircraft to assume, is set into the system and when this altitude is achieved by the aircraft, an audio and visual indication is produced.

A selectively variable range of deviation or variation in altitude from the selected altitude (e.g., 250 feet) is entered into the system and when the aircraft exceeds this range, either above or below, an audio signal is produced. The range to which the system has been set is selectively displayable.

In a still further aspect, the actual local barometric pressure as obtained from air traffic control, for example, may be entered into the system and the measured altitude displayed will be automatically corrected. Alternatively, the barometric pressure set into the system can be displayed in inches of mercury or millibars by simple manipulation of a screw switch.

According to yet another aspect, when the aircraft comes to within 1000 feet of the selected altitude previously entered into the system, a visual indication of the direction the aircraft must maintain to reach the desired altitude (i.e., up or down) is given. On reaching the selected altitude, a visual indication is given that level flight is required. After the aircraft has reached the selected altitude and then subsequently drifted beyond the permitted deviation range, the appropriate visual indication will be energized showing whether the aircraft will have to climb or descend to reassume the predetermined altitude and an audio signal simultaneously given.

The various visual indication means and controls are all arranged on one console or control panel with a single control being manipulated to enter the predetermined altitude, altitude range and barometric pressure settings into the system.

The various visual and audio indications are presented irrespective of the mode in which the system is.

DESCRIPTION OF THE DRAWING

FIGS. 4 and 5 depict a wiring and function block schematic.

DESCRIPTION OF A PREFERRED EMBODIMENT

Figure 1:
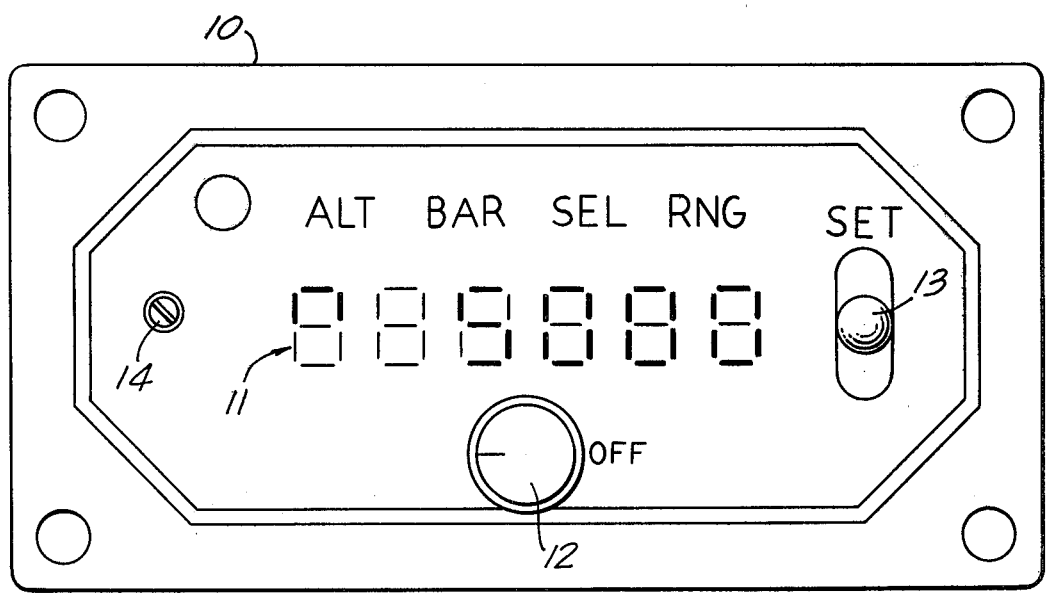
FIG. 1 is a front elevational view of a control and display console for use with the altitude monitoring and alerting system of this invention.

For the ensuing description of the more general aspects and functional operation of the system of this invention, reference is first made to FIG. 1 of the drawing which shows a generally rectangular control and display console 10 for mounting at any convenient location in the aircraft cockpit within easy reach and sight of the pilot. A set of six digital character display means 11 are centrally arranged in a generally horizontal line. A mode switch 12, in addition to an OFF position, has four (4) "on" positions, which correspond to the designations RNG, SEL, BAR and ALT imprinted on the console. Set control 13 (SET) is manipulable to place into the system and display on the means 11, depending on the mode switch 12 setting, altitude (SEL), barometric pressure (BAR) and range of deviation (RNG), as will be more definitely described. Screw switch 14 is adjustable to provide display of barometric pressure in either inches of mercury or millibars, as desired.

The ALT mode setting of the switch 12 displays the present altitude of the aircraft on the digital display means 11. Adjustment of the set switch 13 will not affect altitude reading when in the ALT mode.

When the mode switch 12 is set to BAR, the digital display means 11 will give the last entered value of the barometric pressure either in millibars or inches of mercury, depending on the setting of the screw switch 14. Also, while the mode switch is on BAR the value of the displayed pressure may be changed by adjusting the set control 13 which, in a way that will be described, automatically changes the altitude display (ALT) to correspond to the newly adjusted pressure.

On positioning the mode switch to SEL, adjustment of the set control 13 produces a display of any desired altitude throughout the full range of the system, namely, −1200 to 49,900 feet. The so selected altitude is at the same time entered into the system to be described such that when the aircraft attains the selected altitude, an audible and visual indication is produced.

When the aircraft comes within 1000 feet of the selected altitude, a visual indication is given of the direction that the aircraft must continue to reach the selected altitude. For example, if the aircraft is below the selected altitude the symbol "⊔" will appear on the console. On the other hand, when the aircraft is above the selected altitude and within 1000 feet thereof, the symbol "⊓" is displayed. When the aircraft is exactly at the selected altitude, or within a preset range of the selected altitude, this is indicated by the visual display of the level symbol "—".

The mode switch position RNG permits setting into the system by adjustment of set control 13, a desired range of deviation or variation from the selected altitude within which the symbol "—" will be displayed. The deviation range can vary from 50–750 feet and will apply to deviations both above and below the selected altitude. For example, if the selected altitude is 5000 feet and the present range is 250 feet, the level bar symbol "—" will be displayed throughout the full range 4750–5250 feet.

Figure 2:
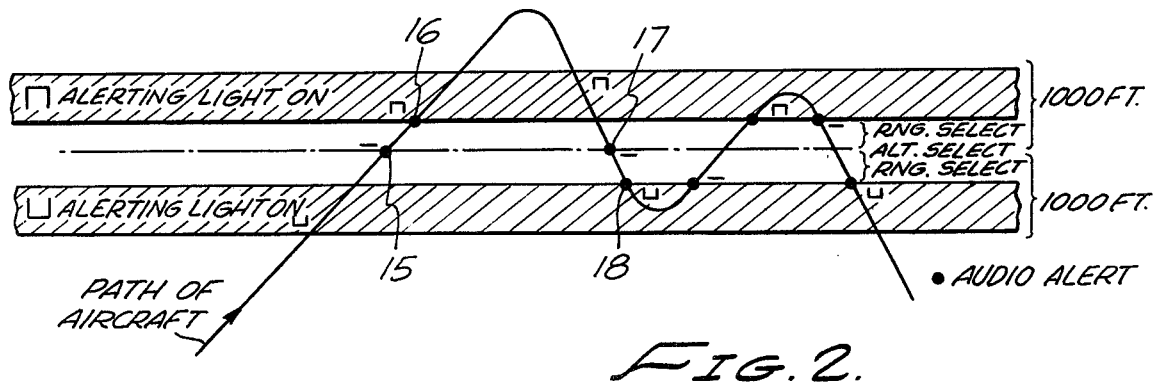
FIG. 2 is a schematic diagram of the flight of an aircraft indicating the various times and operation of the system.

For the ensuing example of functional operation of the present system, reference is made simultaneously to both FIGS. 1 and 2. Also, assume in this example that air traffic control has cleared or instructed the aircraft to 5000 feet, the range of deviation from the 5000 feet altitude is to be 250 feet, and that local barometric pressure is learned to be 29.92 inches. The order of adjustments to be discussed now may be varied and the one chosen is for convenience only in that it follows the mode switch arrangement as it rotates counterclockwise from the "off" position.

The mode switch 12 is first rotated to RNG and the set control 13 is adjusted to cause the display means 11 to register 250 feet. The control 13, when located in its central position, effects no change in the displayed information. As the control is moved upwardly away from the central position an increase in the displayed figure occurs with the rate of increase being relatively slow. Adjusting the control to its uppermost position produces a much faster change in the displayed information. Similarly, moving the control 13 downwardly from the central position a small amount produces a slow decrease in the displayed number, whereas locating the control at its lowermost produces rapid decrease in displayed information. When the correct value is read out on the means 11, the control is returned to the central position.

The mode switch 12 is next turned to SEL and the control 13 adjusted until "5000" registers on the display with manipulation of the control 13 being the same as discussed in the preceding paragraph. It is this altitude that is monitored by the system and in relation to which the various visual and audio indications to be described, are given. For brevity and clarity of expression, this altitude will be referenced herein as the "selected" altitude.

On still further adjustment of the mode switch to BAR, the control is appropriately adjusted until "29.92" is registered on the display. As has already been alluded to, the variation in barometric pressure from that at which the system has been last calibrated is processed by the system to correct the immediate altitude readings being displayed on ALT setting of the mode switch.

With the above preliminary adjustments accomplished, the mode switch will be positioned to ALT which gives a display of the true aircraft altitude, after which the aircraft will begin to climb to assume the cleared altitude of 5000 feet. When the aircraft arrives at an altitude of 4000 feet, the symbol "⊔" will be displayed in the leftmost tube 11 indicating that the aircraft must continue climbing. On arriving at 4750 feet (i.e., 5000–250 deviation range), and still climbing, the symbol "⊔" will continue until on attaining the selected 5000 feet as at 15, both an audio signal, shown by the symbol "." in FIG. 2 and a visual level signal "—" will be given. As long as the aircraft remains at 5000±250 feet, the level visual signal will continue, but the audio alarm is only of short duration. If the aircraft continues climbing, on exceeding 5250 feet, as at 16, the audio alarm will be given again and the direction signal "⊓" will be energized and continue until 6000 feet is reached above which time the visual signal is extinguished.

As the aircraft descends and reaches 6000 feet, the alerting light signal "⊓" is once again energized and remains on until at 5000 feet (point 17) when it is replaced by the level light "—" and the temporary audio signal is heard. If the aircraft continues downwardly to 4750 feet (point 18), the visual symbol "⊔" comes on and will continue until the aircraft once again passes upwardly through the 4750 range.

Figure 3:
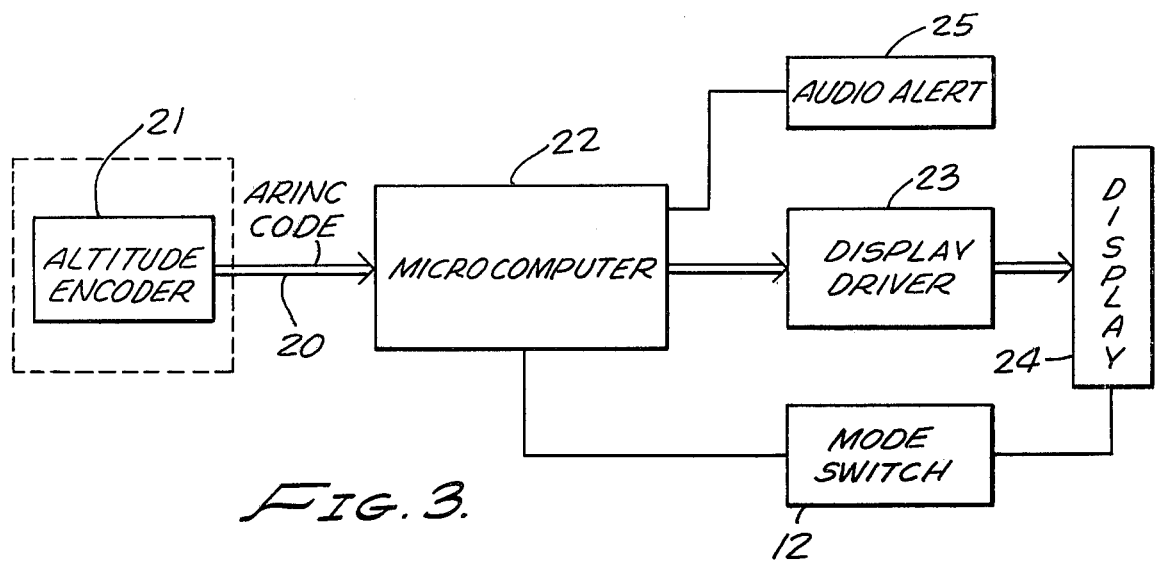

Reference is now made to FIG. 3 for the ensuing system description of the subject invention at the function block level. The means for determining the aircraft altitude on a continuous basis is the altitude encoder 21 which may be any one of a number of commercially available altimeters providing a digital electric signal output at 20 of a value corresponding to the measured altitude. These digital signals are provided in what is termed ARINC code which is a code used by air traffic control in its transponders. A description of the ARINC code is to be found in the publication entitled *Air Traffic Control Transponder*, ARINC Characteristic No. 532D, issued Mar. 1, 1962, Appendix 3 by the Aeronautical Radio, Inc.

The coded digital signals from the encoder 21 are entered into a microcomputer 22 where they are stored and updated in a continuous manner. Also, with the mode switch on ALT the measured altitude will be continuously presented through the display drivers 23 for display on the tubes 11 depicted collectively as at 24.

In addition to the altitude information received from encoder 21, the selected altitude entered with the mode switch 12 on SEL is also stored in the computer, and, as well, can be readout via drivers 23 for display. Moreover, the range variation entered when the mode switch was set to RNG is also stored. The computer compares the stored values of the predetermined altitude, range and actual measured altitude providing visual indications on the console 10 and energizing of an audio alert or alarm 25 at the time of occurrence of the events as shown in FIG. 2 and in the following table:

|  | AUDIO | VISUAL |
|---|---|---|
| Reaching selected altitude from more than 1000 feet above or below | YES | "—" |
| Exceeding RNG but less than 1000' from predetermined altitude | YES | "⊔" or "⊓" |
| Coming into RNG from | YES | "—" |

| | AUDIO | VISUAL |
|---|---|---|
| less than 1000' from predetermined altitude | | |

With mode switch 12 set to BAR, adjustments of control 13 enters this new barometric value into the computer 21 where the actual measured altitude from the sensor 19 and encoder 21 is corrected accurate display at 11 and updated storage in the computer.

For the more detailed description of the circuital aspects of this invention, reference is now made to FIG. 4. The mode switch 12 is in the off position with initiation of operation being made by rotating the switch counterclockwise which will interconnect input power (Vin) through the switch, lead 26 and voltage regulator 27 to pick up a relay 28 thereby connecting the input power via leads 29 and 30 to power supplies 31 and 32, respectively. The relay 28 serves to absorb transient power surges when the power supplies are turned on and off and in that manner preserve the contacts of the mode switch 12.

The power supply 31 provides well regulated electric power (5 volts DC) for the logic circuits, drivers, decoders, the computer and its associated parts. The power supply 32 on the other hand, is confined to providing electric power to the digital display means 11 and lighting means on the console for individually illuminating the different settings of the mode switch 12.

The power supply 31 receives 11–31 volts DC conventionally available in the aircraft and provides a regulated 5 volts DC output (+V). Operation is conventional with the voltage regulator 27 and switching regular 33 being commercially available items. Essentially, the power supply ratios the voltage to the general value desired by the transistors 34, 35 and 36 and refined smoothing being provided by the inductance 37 and capacitor 38.

Power supply 32 is substantially identical in construction and operation to power supply 31 except that it is variable dependent upon the value of photoresistor 38' which, in turn, is proportional to the cockpit ambient light irradiating the photoresistor. In this manner, the display means 11 brightness is automatically compensated for as a function of ambient light. The variable resistors interconnected with the photoresistor enable setting the maximum and minimum brightness either at the factory or in the field, as desired.

Each of the four contacts of the mode switch 12 provides voltage via an amplifier or driver 39 to one of a set of four light emitting diodes 40 through 43. These diodes are located in the console 10 and underneath the respective printed designations of the mode switch setting.

The six digital display means 11 are individually enumerated in FIG. 4 as items 44 through 49 and have a common connection to the power supply 32 via line 50. Each of the means 44 through 49 is a seven segment incandescent display well-known in the industry and having seven input connections with one common, which on selective energization can produce any of the numbers 0 through 9 or other character, as desired.

The display means 45–48 comprise that part of the visual display 11 which will present different numbers and are each interconnected with the computer 22 through respective decoder drivers 51 through 54, respectively, which accept a 4-bit binary code from the computer and produce output drive to the respective seven inputs (not shown) for the display means. The interconnections to the computer from means 45–48 are collectively identified as CONTROL OUT.

The leftmost display means 44 is driven by the computer through a storage latch 55 and driver 56 with multiplexed outputs in order to produce the up ("⊔"), down ("⊓") and level ("—") indications. The last placed digit or the farthest to the right means 49 is also driven from the storage latch 55, a buffer amplifier 57 and a multiplexed output to provide a zero which is the figure that will be displayed on this position for all readings of altitude, select or range and which position is blanked in the BAR mode.

Still referring to FIG. 4, the set switch control 13 is a commercially available two-pole switch having a central "off" position, two up "on" positions and two down "on" positions. When the switch control is moved upwardly, the first "on" position provides a relatively slow increase in the displayed number while the uppermost "on" position provides a fast increase. Similarly, when the switch toggle is moved downwardly, the first position is for slow operation, and the lowermost position is for fast operation.

The set screw switch 14 when open provides a first signal input to the computer for giving a display in inches of mercury for the barometric pressure. When the switch is closed, this produces a different set of signals for giving the barometric reading in millibars.

Interconnection of the mode switch 12, screw switch 14 and the set control 13 to the computer are as shown, with the corresponding interconnection in FIG. 5 being identified generally as MODE SWITCH AND SET CONTROL.

Turning now particularly to FIG. 5, the microcomputer 22 is seen to include in its major parts a processor 60, a random access memory (RAM) 61, a programmable read-only memory 62, an address latch 63, and a binary-to-decimal decoder 64. For simplicity purpose, and since as will be shown these major parts of the computer are all purchased items, all of the necessary voltage connections are not given.

The altitude information from the encoder 21 is entered into the memory 61 via isolation diode lines shown which are also individually biased through the resistors 64. The six lines identified generally as FROM MODE SWITCH AND MODE SELECTOR interconnect to the corresponding six lines shown in FIG. 4 via which the control 13 and the mode switch 12 enter data into the memory 61. The five lines collectively identified as DISPLAY CONTROL OUT and the lines termed DISPLAY DATA interconnect with the correspondingly identified lines in FIG. 4 and provide the necessary information for display on the digital display means in accordance with position of the mode switch and the processed information to indicate the various altitude relationships.

The binary-to-decimal decoder 64 converts the binary output data obtained from the computer to a 1 of 8 decimal code permitting its ready assimilation and use to the required seven digit form needed to energize the decimal display units. The programmable read-only memory 62 has associated therewith the address latch 63 for temporary storage of address information and is interconnected with the processor and memory, as well as the binary-to-decimal decoder 64.

The audio alert 20 is actuated by a computer originated signal via the binary-to-decimal decoder 64 through lead 66. The audio alert is essentially a dual timer 67 which upon being pulsed by the decoder 64 produces an audio electric signal (e.g., 3 KHz) for a fixed period of time (3 seconds). The audio signal drives a conventional speaker 68 to provide the audio signal. A further low level audio signal (AUDIO OUTPUT) is provided for optional use to drive a set of earphones.

In a practical construction of the described system the following commercially available items were used for the correspondingly enumerated equipment or circuit arrangements:

Voltage regulator 27—A 12 volt voltage regulator manufactured under the trade designation LM34OT-12.0 by National Semiconductor, Santa Clara, California.

Switching regulator 63—A switching regulator manufactured under the trade designation TL497 by Texas Instruments.

Digital display means 11, 44–49—Manufactured and sold under the designation MD-450 by Refac Corp., Winston, Connecticut.

Decoder drive 51-54—BCD to seven segment decoder driver, Part No. 9374 by Fairchild.

Storage latch 55—Model 4042 by National Semiconductor.

Processor 60—Microprocessor manufactured and sold by Intel Corporation, Santa Clara, California, under the trade designation 8085.

Random access memory 61—Memory sold by Intel Corp. under designation 8155.

Programmable read-only memory 62—A 16,384-bit ultraviolet erasable and electrically programmable read-only memory sold by Intel Corp. under designation 2716.

Address latch 63—Manufactured and sold by Texas Instruments, Dallas, Texas, under designation SN74LS273.

Binary-to-decimal decoder 64—3-bit binary to 1 of 8 decoder manufactured by Texas Instruments under designation SN74LS138.

Dual timer 67—A dual timer manufactured by National Semiconductor under designation LM556.

The computer 22, which is more particularly shown in FIG. 5 and interconnected with the circuit apparatus of FIG. 4, provides the audio and visual indications depicted in FIG. 2 and as set forth in the table given previously herein when under the control of the following program:

| AF | D3 | 28 | 21 | 80 | 0B | 22 | 1C | 28 | 21 | F5 | 03 | 22 | 1A | 28 | 21 |
|----|----|----|----|----|----|----|----|----|----|----|----|----|----|----|----|
| 17 | 28 | 36 | 11 | 23 | 36 | 00 | 21 | 0C | 00 | 22 | 02 | 28 | 3E | 02 | 32 |
| 04 | 28 | 31 | FF | 28 | CD | 49 | 02 | DB | 2B | E6 | 38 | CC | 50 | 00 | FE |
| 30 | CC | 20 | 04 | FE | 20 | CC | A0 | 03 | FE | 10 | CC | 70 | 00 | FE | 08 |
| CC | A0 | 00 | E6 | 08 | 06 | 05 | C4 | 19 | 03 | C3 | 28 | 00 | 00 | 00 | 00 |
| AF | 32 | 16 | 28 | 3C | 32 | 0F | 28 | CD | 30 | 01 | CD | B0 | 01 | 21 | 00 |
| 28 | CD | 60 | 02 | DB | 2B | E6 | 38 | C0 | C3 | 50 | 00 | 00 | 00 | 00 | 00 |
| AF | 32 | 16 | 28 | 3C | 32 | 0F | 28 | 21 | 02 | 28 | CD | 60 | 02 | DB | 2B |
| E6 | 38 | FE | 10 | C0 | 2A | 02 | 28 | EB | CD | E9 | 00 | 7A | E6 | 01 | 57 |
| EB | 22 | 02 | 28 | CD | 30 | 01 | CD | B0 | 01 | C3 | 70 | 00 | 00 | 00 | 00 |
| 3E | 05 | 32 | 16 | 28 | 3E | 01 | 32 | 0F | 28 | 16 | 00 | 3A | 04 | 28 | 5F |
| 21 | 13 | 28 | CD | F6 | 02 | DB | 2B | E6 | 38 | FE | 08 | C0 | 3A | 04 | 28 |
| 5F | 3E | 01 | 32 | 0D | 28 | CD | E9 | 00 | AF | 32 | 0D | 28 | 7B | E6 | 07 |
| 32 | 04 | 28 | CD | 30 | 01 | CD | B0 | 01 | C3 | A5 | 00 | 00 | 00 | 00 | 00 |
| 00 | 00 | 00 | 00 | 00 | 00 | 00 | 00 | 00 | 21 | 19 | 28 | DB | 2B | E6 | 07 |
| 47 | 3A | 0D | 28 | D6 | 00 | CA | 04 | 01 | 78 | FE | 02 | CA | 08 | 01 | FE |
| 04 | CA | 08 | 01 | 05 | CA | 21 | 01 | 05 | CA | 20 | 01 | 05 | CA | 1E | 01 |
| 05 | CA | 26 | 01 | 05 | CA | 24 | 01 | CD | 19 | 03 | C3 | EC | 00 | 35 | C0 |
| 1B | 36 | 0A | C9 | 35 | C0 | 13 | 36 | 0A | C9 | 00 | 00 | 00 | 00 | 00 | 00 |
| DB | 29 | 2F | CD | 50 | 03 | 5F | DB | 2A | 2F | 47 | E6 | 07 | CA | A7 | 01 |
| FE | 05 | CA | A7 | 01 | FE | 07 | CA | A7 | 01 | 7B | E6 | 01 | 78 | CA | 55 |
| 01 | C6 | 08 | E6 | 0F | CD | 50 | 03 | 47 | E6 | 08 | C2 | 72 | 01 | 78 | E6 |
| 07 | EE | 07 | CA | 6C | 01 | 78 | D6 | 01 | C3 | 7B | 01 | 78 | D6 | 03 | C3 |
| 7B | 01 | 78 | E6 | 07 | CA | 6C | 01 | 78 | D6 | 05 | 47 | 3E | 0A | 16 | 00 |
| CD | 40 | 03 | 16 | 00 | 58 | 19 | CD | 70 | 03 | EB | 2A | 17 | 28 | 26 | 00 |
| 19 | 3A | 18 | 28 | FE | 00 | 06 | 04 | 11 | EE | FF | C2 | 9F | 01 | 13 | 19 |
| 22 | 00 | 28 | D2 | A9 | 01 | C9 | 06 | 03 | CD | 19 | 03 | 03 | 30 | 01 | 00 |
| 11 | 00 | 28 | 21 | 02 | 28 | 01 | 05 | 28 | CD | 30 | 03 | D2 | CB | 01 | 3F |
| 01 | 32 | 0C | 28 | 2B | 1B | 0B | EB | CD | 30 | 03 | 0A | D6 | 00 | C2 | 49 |
| 02 | 0B | 0A | D6 | 00 | CA | F0 | 01 | 21 | 05 | 28 | 3E | 0A | BE | DA | 49 |
| 02 | 3A | 04 | 28 | BE | DA | 0B | 02 | AF | 21 | 0B | 28 | BE | CA | 0B | 02 |
| 21 | 10 | 28 | 36 | 01 | 21 | 09 | 28 | AF | BE | CC | 3A | 03 | 2B | 77 | 23 |
| 23 | 77 | 3C | 23 | 77 | 2B | 2B | 77 | C3 | 57 | 02 | AF | 21 | 0C | 28 | BE |
| CA | 2E | 02 | 21 | 10 | 28 | 36 | 04 | AF | 21 | 09 | 28 | BE | C4 | 3A | 03 |

-continued

| | | | | | | | | | | | | | | |
|---|---|---|---|---|---|---|---|---|---|---|---|---|---|---|
| 2B | BE | C4 | 3A | 03 | 77 | 23 | 77 | 23 | 3C | 77 | C3 | 57 | 02 | 21 | 10 |
| 28 | 36 | 02 | AF | 21 | 09 | 28 | BE | C4 | 3A | 03 | 23 | BE | C4 | 3A | 03 |
| 77 | 2B | 77 | 3C | 2B | 77 | C3 | 57 | 02 | AF | 21 | 08 | 28 | 32 | 10 | 28 |
| 77 | 23 | 77 | 23 | 77 | 23 | 77 | 21 | 0C | 28 | AF | 77 | 23 | 77 | C9 | 00 |
| 7E | D6 | 0C | 5F | 23 | 7E | DE | 00 | 57 | D2 | 77 | 02 | 2B | 3E | 0C | 96 |
| 5F | AF | 57 | 3C | 32 | 0E | 28 | 21 | 13 | 28 | CD | F6 | 02 | AF | 32 | 0E |
| 28 | 09 | 00 | 00 | 00 | 00 | 00 | 00 | 00 | 00 | 00 | 00 | 00 | 00 | 00 | 00 |
| 11 | 01 | 30 | 21 | 13 | 28 | 0E | 03 | 79 | 32 | 11 | 28 | 3A | 0E | 28 | D6 |
| 00 | CA | A6 | 02 | 36 | 0A | 3A | 11 | 28 | D6 | 00 | CA | C1 | 02 | 3E | 0A |
| BE | CA | C1 | 02 | AF | BE | CA | BF | 02 | 32 | 11 | 28 | C3 | C1 | 02 | 36 |
| FF | 7E | 12 | 23 | 13 | 0D | C2 | A6 | 02 | UE | 12 | 21 | 0E | 28 | AF | 77 |
| 23 | 7E | D6 | 01 | 23 | 7E | 21 | 00 | 30 | DA | E0 | 02 | F6 | 08 | 77 | 09 |
| E6 | F7 | 77 | C9 | 00 | 00 | 00 | 00 | 00 | 00 | 00 | 00 | 00 | 00 | 00 | 00 |
| 01 | E8 | 03 | CD | 08 | 03 | 01 | 64 | 00 | CD | 08 | 03 | 01 | 0A | 00 | CD |
| 08 | 03 | 73 | CD | 90 | 02 | 09 | 00 | 36 | FF | 34 | 7B | 91 | 5F | 7A | 98 |
| 57 | D2 | 0A | 03 | EB | 09 | EB | 23 | 09 | D5 | 11 | 00 | 30 | 3E | 01 | 12 |
| 13 | 3E | 0B | 12 | 13 | 12 | AF | 13 | 12 | 78 | 13 | 12 | D1 | 09 | 00 | 00 |
| 1A | 96 | 02 | 13 | 03 | 23 | 1A | 9E | 02 | 09 | 32 | 05 | 30 | AF | 09 | 00 |
| 21 | 00 | 00 | 3D | F8 | 19 | C3 | 43 | 03 | 00 | 00 | 00 | 00 | 00 | 00 | 00 |
| B7 | 0E | 09 | 17 | 0D | C8 | 47 | DA | 62 | 03 | E6 | 01 | 02 | 67 | 03 | 03 |
| 68 | 03 | E6 | 01 | 02 | 68 | 03 | 37 | 78 | C3 | 53 | 03 | 00 | 00 | 00 | 00 |
| 11 | 00 | 18 | 1B | 7A | B3 | C2 | 73 | 03 | EB | 2A | 20 | 28 | EB | 7A | BC |
| C2 | 86 | 03 | 7B | BD | C8 | 22 | 20 | 28 | CD | 30 | 01 | 09 | 00 | 00 | 00 |
| 00 | 00 | 00 | 00 | 00 | 00 | 00 | 00 | 00 | 00 | 00 | 00 | 00 | 00 | 00 | 00 |
| AF | 32 | 0F | 28 | 2A | 1C | 28 | EB | 21 | 13 | 28 | CD | F0 | 02 | DB | 2B |
| E6 | 38 | FE | 20 | C0 | 2A | 1C | 28 | EB | CD | E9 | 00 | EB | 22 | 1C | 28 |
| 11 | 10 | F5 | 19 | EB | DA | CE | 03 | 21 | F0 | 0A | C3 | BD | 03 | 21 | C0 |
| FE | 19 | D2 | DC | 03 | 00 | 21 | 2F | 0C | C3 | BD | 03 | FB | 22 | 1E | 28 |
| EB | 21 | A3 | FF | 19 | 21 | 18 | 28 | 36 | FF | DA | EE | 03 | 34 | 34 | 3E |
| 09 | CD | 40 | 03 | 11 | E4 | FF | 19 | EB | 21 | 17 | 28 | 01 | 64 | 00 | 36 |
| FF | D2 | 0F | 04 | CD | 08 | 03 | 2B | 3E | 32 | BB | FA | 0F | 04 | 35 | 34 |
| CD | 30 | 01 | CD | B0 | 01 | C3 | A4 | 03 | 00 | 00 | 00 | 00 | 00 | 00 | 00 |
| AF | 32 | 0F | 28 | 3C | 32 | 18 | 28 | 2A | 1A | 28 | EB | 21 | 13 | 28 | CD |
| F0 | 02 | DB | 2B | E6 | 38 | FE | 30 | C0 | 2A | 1A | 28 | EB | CD | E9 | 00 |
| EB | 22 | 1A | 28 | 11 | 4B | FC | 19 | EB | DA | 52 | 04 | 21 | B5 | 03 | C3 |
| 41 | 04 | 21 | 93 | FF | 19 | D2 | 5F | 04 | 21 | 21 | 04 | C3 | 41 | 04 | 3E |
| 1C | CD | 40 | 03 | 22 | 22 | 28 | 21 | C0 | FF | 19 | EB | 2A | 22 | 28 | D2 |
| 78 | 04 | 7D | 93 | 6F | 7C | 9A | 67 | EB | 21 | 17 | 28 | 01 | 64 | 00 | CD |
| 08 | 03 | 2B | 3E | 32 | BB | FA | 8A | 04 | 35 | 34 | CD | 30 | 01 | CD | B0 |
| 01 | C3 | 20 | 04 | 00 | 00 | 00 | 00 | 00 | 00 | 00 | 00 | 00 | 00 | 00 | 00 |

The computer as programmed receives and stores in its data base the selected altitude (SEL), 1000 feet on each side of the selected altitude, altitude variation range (RNG) and the continuous altitude of the aircraft as determined by the altitude encoder. As the mode switch is located in its different settings visual display of the actual altitude, selected altitude and barometric pressure are given on the console and automatically reentered into memory. The various altitudes in the memory are compared and when comparison coincidence is achieved as shown in FIG. 2 and the table previously given, the corresponding visual and/or audio indications are produced.

We claim:

1. A method with the aid of a digital computer, of selectively energizing visual means when an aircraft attains certain altitudes which comprises the steps of:

providing the computer with a data base including at least the selected altitude, and a first pair of altitudes a fixed amount above and below the selected altitude, a second pair of altitudes above and below the selected altitude a prescribed range less than that of said first pair of altitudes;

continuously providing the computer with the aircraft actual altitude;

repetitively comparing in the computer the actual aircraft altitude and the second pair of altitudes, and energizing the visual means when there is comparison coincidence of the selected altitude and actual altitude, and thereafter energizing the visual means when the actual altitude lies between the first pair of altitudes and energizing an audio means when the actual altitude moves from between the second pair of altitudes to outside the altitude range between said second pair of altitudes; and automatically energizing said visual means on comparison coincidence of the actual altitude and the selected altitude to provide a first visual symbol, on comparison of the actual altitude and the fixed altitude above the selected altitude to provide a second visual symbol indicating the aircraft should decrease its altitude, and on comparison of the actual altitude and the fixed altitude below the selected altitude to provide a third visual symbol indicating the aircraft should increase its altitude; and selectively providing a visual digital display of the actual altitude, the selected altitude and the prescribed range.

2. A method as in claim 1, including the further steps of providing the data base with barometric pressure, correcting actual altitude in accordance with barometric pressure and displaying the visual digital representation of the corrected actual altitude and the barometric pressure.

3. A method as in claim 1, including the further steps of providing a first visual display when the actual altitude is between the second pair of altitudes, a second visual display when the actual altitude exceeds the greater of the second pair of altitudes but is less than the greater of the first pair of altitudes, and a third visual display when the actual altitude is less than the lesser of the second pair of altitudes but greater than the lesser of the first pair of altitudes.

* * * * *